(12) United States Patent
Sinanoglu et al.

(10) Patent No.: US 10,853,523 B2
(45) Date of Patent: Dec. 1, 2020

(54) SYSTEM, METHOD AND COMPUTER-ACCESSIBLE MEDIUM FOR SATISFIABILITY ATTACK RESISTANT LOGIC LOCKING

(71) Applicant: New York University, New York, NY (US)

(72) Inventors: Ozgur Sinanoglu, Abu Dhabi (AE); Muhammad Yasin, Abu Dhabi (AE); Jeyavijayan Rajendra, Brooklyn, NY (US)

(73) Assignee: New York University in Abu Dhabi Corporation, Abu Dhabi (AE)

( * ) Notice: Subject to any disclaimer, the term of this patent is extended or adjusted under 35 U.S.C. 154(b) by 0 days.

(21) Appl. No.: 16/087,911

(22) PCT Filed: Mar. 20, 2017

(86) PCT No.: PCT/US2017/023212
§ 371 (c)(1),
(2) Date: Sep. 24, 2018

(87) PCT Pub. No.: WO2017/165296
PCT Pub. Date: Sep. 28, 2017

(65) Prior Publication Data
US 2019/0340394 A1    Nov. 7, 2019

Related U.S. Application Data

(60) Provisional application No. 62/311,465, filed on Mar. 22, 2016.

(51) Int. Cl.
*G06F 21/82* (2013.01)
*G06F 21/75* (2013.01)

(52) U.S. Cl.
CPC ................................. *G06F 21/75* (2013.01)

(58) Field of Classification Search
CPC .......... G06F 21/75; G06F 21/00; G06F 21/70; G06F 16/252; G06F 16/2343
(Continued)

(56) References Cited

U.S. PATENT DOCUMENTS 5,239,262 A    8/1993    Grutzner et al.
6,445,167 B1   9/2002    Marty
(Continued)

OTHER PUBLICATIONS

International Written Opinion for International Application No. PCT/US2017/023212 dated Jun. 1, 2017.
(Continued)

*Primary Examiner* — Haresh N Patel
(74) *Attorney, Agent, or Firm* — Hunton AK LLP

(57) ABSTRACT

Exemplary embodiment of the present disclosure can include, for example, a logic-locking circuit ("SARLock"), which can include a logic cone(s) receiving a distinguishing input pattern(s) (DIP), a comparator(s) receiving the DIP(s) and a key value(s), and a logic gate(s) connected to an output of the logic cone and to an output of the comparator. A mask(s) can be connected to the comparator(s) and the logic gate(s). The logic gate(s) can be a XOR gate(s). The comparator(s) can be configured to flip a signal(s) based on a combination of the DIP(s) and the key value(s). A mask(s) can be connected to the comparator(s) and the logic gate(s), which can be configured to prevent the flipped signal(s) from being asserted for a correct key value(s).

22 Claims, 8 Drawing Sheets

(58) Field of Classification Search
USPC .......................................................... 726/34
See application file for complete search history.

(56) References Cited

U.S. PATENT DOCUMENTS

| | | | |
|---|---|---|---|
| 2004/0102019 A1 | 5/2004 | Jarvis et al. | |
| 2005/0105736 A1* | 5/2005 | Chen ...................... | H04L 9/0861 380/277 |
| 2007/0011340 A1* | 1/2007 | Seidl ...................... | G06F 16/958 709/228 |
| 2009/0077670 A1* | 3/2009 | Schireson ........... | G06F 21/6218 726/27 |
| 2010/0284539 A1* | 11/2010 | Roy ................. | H03K 19/17768 380/278 |
| 2012/0079440 A1 | 3/2012 | Akar et al. | |
| 2012/0143554 A1 | 6/2012 | Cambou et al. | |
| 2012/0266120 A1 | 10/2012 | Buechner et al. | |
| 2013/0268906 A1* | 10/2013 | Arbel ...................... | G06F 17/504 716/107 |
| 2014/0037089 A1* | 2/2014 | Itoh ....................... | H04L 9/0869 380/46 |
| 2014/0375353 A1* | 12/2014 | Sinanoglu ............. | G06F 17/505 326/8 |
| 2015/0135014 A1* | 5/2015 | Pepper .................. | G06F 11/263 714/30 |
| 2015/0312046 A1* | 10/2015 | Kumar .................. | H04L 9/0891 713/158 |
| 2016/0034694 A1* | 2/2016 | Rajendran ................ | G09C 1/00 713/190 |
| 2016/0077154 A1* | 3/2016 | Amar ..................... | H03K 19/20 714/732 |
| 2019/0042711 A1* | 2/2019 | Parhi ....................... | G06F 21/14 |
| 2019/0129892 A1* | 5/2019 | Sinanoglu ............. | G06F 16/252 |

OTHER PUBLICATIONS

International Search Report for International Application No. PCT/US2017/023212 dated Jun. 1, 2017.

"Defense Science Board (DSB) study on High Performance Microchip Supply," 2005, [Mar. 16, 2015]. [Retrieved from internet]; www.acq.osd.mil/dsb/reports/ADA435563.pdf, p. 1.

Karri et al., "Trustworthy Hardware: Identifying and Classifying Hardware Trojans," IEEE Computer, vol. 43, No. 10, pp. 39-46, Oct. 2010.

Rajendran et al., "Security Analysis of Integrated Circuit Camouflaging," In Proc. ACM/SIGSAC Conference on Computer & Communications Security, pp. 709-720, 2013.

Koushanfar, "Integrated Circuits Metering for Piracy Protection and Digital Rights Management: An Overview," in Proc. Great Lakes Symposium on VLSI, pp. 449-454, 2011.

Lee et al., "Improving Logic Obfuscation via Logic Cone Analysis," In Proc. IEEE Latin-American Test Symposium, pp. 1-6, 2015.

Chakraborty et al., "HARPOON: An Obfuscation-Based SoC Design Methodology for Hardware Protection," IEEE Trans. Comput.-Aided Design Integr. Circuits Syst., vol. 28, No. 10, pp. 1493-1502, 2009.

Rajendran et al., "Security Analysis of Logic Obfuscation," In Proc. IEEE/ACM Design Automation Conference, pp. 83-89, 2012.

Baumgarten et al., "Preventing IC Piracy Using Reconfigurable Logic Barriers," IEEE Des. Test. Comput., vol. 27, No. 1, pp. 66-75, 2010.

Rajendran et al."Fault Analysis-Based Logic Encryption," IEEE Trans. Comput., vol. 64, No. 2, pp. 410-424, 2015.

Rajendran et al. "Logic Encryption: A Fault Analysis Perspective," In Proc. Design, Automation and Test in Europe, pp. 953-958, 2012.

Plaza et al., "Solving the Third-Shift Problem in IC Piracy With Test-Aware Logic Locking," IEEE Trans. Comput.-Aided Design Integr. Circuits Syst., vol. 34, No. 6, pp. 961-971, Jun. 2015.

Roy et al., "EPIC: Ending Piracy of Integrated Circuits," In Proc. Design, Automation and Test in Europe, pp. 1069-1074, 2008.

Contreras et al., "Secure Split-Test for Preventing IC Piracy by Uuntrusted Foundry and Assembly," In Proc. IEEE International Symposium on Defect and Fault Tolerance in VLSI and Nanotechnology Systems, pp. 196-203, 2013.

Subramanyan et al., "Evaluating the Security of Logic Encryption Algorithms," In Proc. IEEE International Symposium on Hardware Oriented Security and Trust, pp. 137-143, 2015.

"OpenSPARC T1 Processor," 2015, [Nov. 1, 2015]. [Retrived from the Internet] http://www.oracle.com/technetwork/systems/opensparc/opensparc-t1-page-1444609.html, p. 1.

"Decryption tool binaries and benchmark circuits." [Sep. 30, 2015]. [Retrieved from the Internet. https://bitbucket.org/spramod/host15-logic-encryption, p. 1.

Canetti, Ran "Towards Realizing Random Oracles: Hash Functions That Hide All Partial Information," in Proc. Annual International Cryptology Conference, pp. 455-469, 1997.

Boneh, Dan "The Decision Diffie-Hellman Problem," In Algorithmic guess the secret key for ICs that are activated prior to the Number Theory. Springer, pp. 48-63, 1998.

Sutter et al., "Modular Multiplication and Exponentiation Architectures for Fast RSA Cryptosystem Based on Digit Serial Computation," IEEE Trans. Ind. Electron., vol. 58, No. 7, pp. 3101-3109, Jul. 2011.

Roy et al., "Protecting Bus-Based Hardware IP by Secret Sharing," in Proc. IEEE/ACM Design Automation Conference, pp. 846-851, 2008.

Naik et al., "Large Integrated Crossbar Switch," In IEEE International Conference on Wafer Scale Integration, pp. 217-227, 1995.

Karimi et al., "On the Correlation between Controller Faults and Instruction-Level Errors in Modern Microprocessors," In Proc. IEEE International Test Conference, pp. 1-10, 2008.

Alkabani et al., "Active Hardware Metering for Intellectual Property Protection and Security," In Proc. USENIX Security, pp. 291-306, 2007.

* cited by examiner

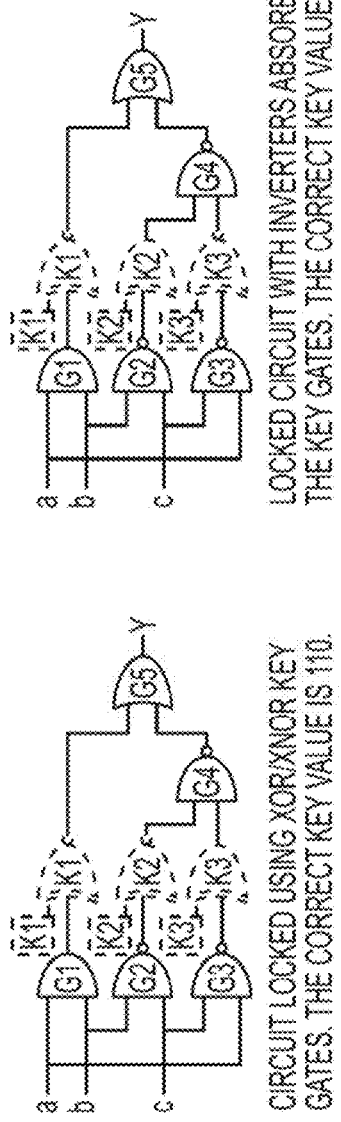
FIG. 1A
EXAMPLE CIRCUIT. MAJORITY OF INPUTS
FIG. 1B
CIRCUIT LOCKED USING XOR/XNOR KEY GATES. THE CORRECT KEY VALUE IS 110.
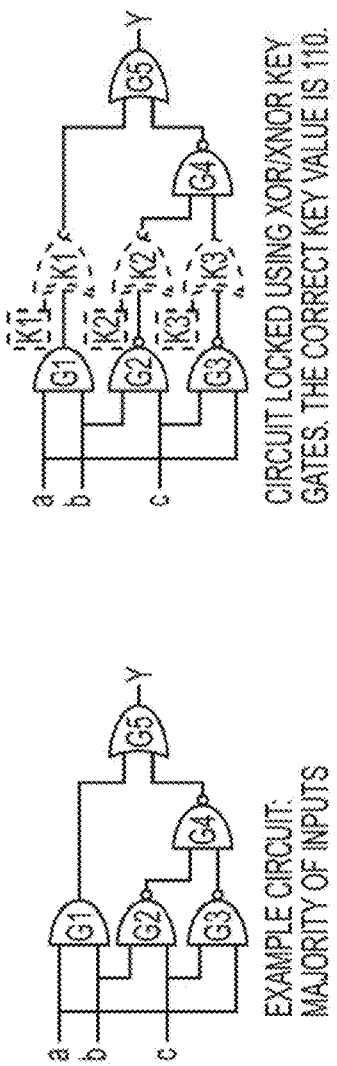
FIG. 1C
LOCKED CIRCUIT WITH INVERTERS ABSORBED BY THE KEY GATES. THE CORRECT KEY VALUE IS 110.
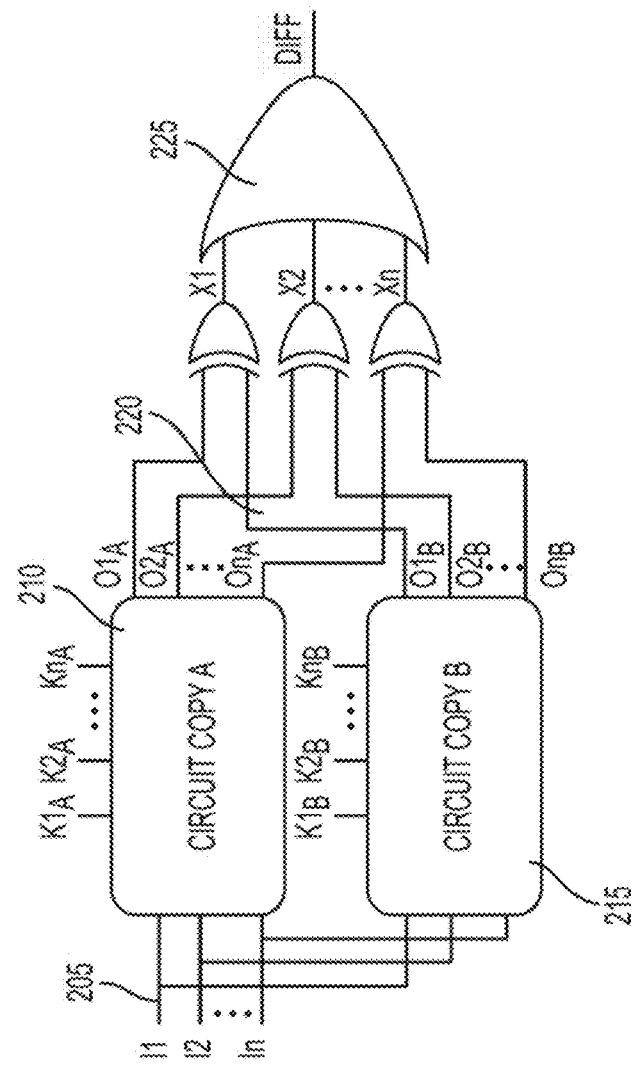
FIG. 2

FIG. 3

| No. | a | b | c | Y | k0 | k1 | k2 | k3 | k4 | k5 | k6 | k7 | PRUNED KEY VALUES |
|---|---|---|---|---|---|---|---|---|---|---|---|---|---|
| 0 | 0 | 0 | 0 | 0 | 1 | 1 | 1 | 1 | 1 | 1 | 0 | 1 | |
| 1 | 0 | 0 | 1 | 0 | 1 | 1 | 1 | 1 | 1 | 1 | 0 | 1 | iter 1:k4 |
| 2 | 0 | 1 | 0 | 0 | 1 | 1 | 1 | 1 | 1 | 1 | 0 | 1 | |
| 3 | 0 | 1 | 1 | 1 | 1 | 1 | 1 | 1 | 0 | 1 | 1 | 1 | iter 4:ALL INCORRECT |
| 4 | 1 | 0 | 0 | 0 | 1 | 1 | 1 | 1 | 1 | 1 | 0 | 1 | iter 3:k7 |
| 5 | 1 | 0 | 1 | 1 | 1 | 1 | 1 | 1 | 1 | 1 | 1 | 0 | |
| 6 | 1 | 1 | 0 | 1 | 1 | 1 | 0 | 1 | 1 | 1 | 1 | 1 | iter 2:k1 |
| 7 | 1 | 1 | 1 | 1 | 1 | 0 | 1 | 1 | 1 | 1 | 1 | 1 | |

| No. | a | b | c | Y | k0 | k1 | k2 | k3 | k4 | k5 | k6 | k7 |
|---|---|---|---|---|---|---|---|---|---|---|---|---|
| 0 | 0 | 0 | 0 | 0 | 1 | 0 | 0 | 0 | 0 | 0 | 0 | 0 |
| 1 | 0 | 0 | 1 | 0 | 0 | 0 | 1 | 0 | 0 | 0 | 0 | 0 |
| 2 | 0 | 1 | 0 | 0 | 0 | 1 | 0 | 0 | 1 | 1 | 0 | 1 |
| 3 | 0 | 1 | 1 | 1 | 1 | 1 | 1 | 0 | 1 | 1 | 0 | 1 |
| 4 | 1 | 0 | 0 | 0 | 0 | 0 | 0 | 0 | 1 | 0 | 1 | 0 |
| 5 | 1 | 0 | 1 | 1 | 1 | 1 | 1 | 1 | 1 | 0 | 1 | 1 |
| 6 | 1 | 1 | 0 | 1 | 1 | 1 | 1 | 1 | 1 | 1 | 1 | 1 |
| 7 | 1 | 1 | 1 | 1 | 1 | 1 | 1 | 1 | 1 | 1 | 1 | 0 |

SYSTEM, METHOD AND COMPUTER-ACCESSIBLE MEDIUM FOR SATISFIABILITY ATTACK RESISTANT LOGIC LOCKING

CROSS REFERENCE TO RELATED APPLICATION(S)

The present application relates to and claims priority from International Patent Application No. PCT/US2017/023212 filed Mar. 20, 2017 which published as International Publication No. WO 2017/165296 on Sep. 28, 2017, and from U.S. Provisional Patent Application No. 62/311,465, filed on Mar. 22, 2016, the entire disclosures of which is are incorporated herein by reference.

FIELD OF THE DISCLOSURE

The present disclosure relates generally to logic locking, and more specifically, to exemplary embodiments of an exemplary system, method and computer-accessible medium for satisfiability attack resistant logic locking.

BACKGROUND INFORMATION

The evolving complexity of Integrated Circuits ("ICs"), and the skyrocketing costs of building and/or maintaining a semiconductor foundry, have propelled the globalization of IC design and manufacturing flow. (See, e.g., Reference 1). Design houses can purchase Intellectual property ("IP") cores from third-party IP vendors to reduce their design effort, and to meet strict time-to-market constraints. Many companies, such as Apple, operate fabless, and outsource the fabrication to offshore foundries. In a globalized IC supply chain, untrusted agents can obtain access to the valuable IP, or the physical IC, which can give rise to security threats. These malicious agents can pirate the IP, overbuild ICs for illegal sale, tamper with the ICs to insert malicious circuitry in the form of Hardware Trojans ("HTs"), or reverse engineer the netlist from an IC for unlicensed use. (See, e.g., Reference 2).

Countermeasures, such as IC camouflaging (see, e.g., Reference 3), split manufacturing (see, e.g., Reference 4), and IC metering (see, e.g., Reference 5) have been developed to thwart these attacks. Logic locking is a set of procedures that can thwart IP piracy, overbuilding, and reverse engineering attacks by locking a design with a secret key. (See, e.g., References 6, an d10-13). To facilitate chip-locking features, additional logic, for example, XOR/XNORs gates referred to as key gates, can be added to the original netlist to obtain a locked netlist.

FIG. 1A shows an exemplary netlist, and FIG. 1B illustrates its locked version through three XOR/XNOR key gates. One of the inputs of each key gate can be driven by a wire in the original design, while the other input, referred to as a key input, can be driven by a key bit stored in a tamper-proof memory. The inverters in the netlist can be moved around to increase the obfuscation complexity as shown in FIG. 1C. An attacker will not know whether the inverter can be a part of original design or added for logic locking. This locked netlist can pass through the untrusted design/fabrication stages. A locked IC, or a locked netlist, will not generate a correct output unless it can be activated using the correct key. Even if an attacker gets access to the locked netlist with the key gates, either by stealing from the design house, or by reverse engineering the masks in the foundry, the netlist could implement one of any number of functions determined by the key value that are unknown to the attacker.

Several known procedures have exploited weaknesses of different combinational logic locking procedures and developed attacks that recover the secret key. (See, e.g., References 8, 12, 14 and 15). While specific attacks focus on specific weak points of a logic locking procedure, a more general attack was previously presented that breaks all existing combinational logic locking procedures; recovering the secret key within a few hours for most of the locked circuits. (See, e.g., Reference 15).

The attack described herein above can use Boolean satisfiability ("SAT") based procedures, which can be referred to as a SAT attack. (See, e.g., Reference 15). In the threat model of the attack, the attacker can be a malicious agent in the foundry with access to the following: (i) a locked netlist with the key gates and (ii) a functional IC with the correct key embedded inside. The attacker can apply inputs to the IC and observe the outputs.

The objective of the attacker can be to extract the secret key. The SAT attack uses modern SAT solvers to compute special distinguishing input patterns ("DIP"). (See, e.g., Reference 15). These patterns, along with the correct output collected from the functional IC, can be used to reduce the key search space by eliminating the incorrect keys. A single distinguishing input pattern can eliminate/discriminate multiple incorrect key values. The attack can be successful when all incorrect key values can be eliminated.

Thus, it may be beneficial to provide an exemplary system, method and computer-accessible medium for satisfiability attack resistant logic locking, which can overcome at least some of the deficiencies described herein above.

SUMMARY OF EXEMPLARY EMBODIMENTS

Exemplary embodiment of the present disclosure can include, for example, a logic-locking circuit ("SARLock"), which can include a logic cone(s) receiving a distinguishing input pattern(s) (DIP), a comparator(s) receiving the DIP(s) and a key value(s), and a logic gate(s) connected to an output of the logic cone and to an output of the comparator. A mask(s) can be connected to the comparator(s) and the logic gate(s). The logic gate(s) can be a XOR gate(s). The comparator(s) can be configured to flip an input signal(s) to the comparator based on a combination of the DIP(s) and the key value(s). A mask(s) can be connected to the comparator(s) and the logic gate(s), which can be configured to prevent the flipped signal(s) from being asserted for a correct key value(s). In some exemplary embodiments of the present disclosure, a scrambler(s) can be configured to provide the key value(s) to the comparator(s). The scrambler(s) can be configured to corrupt an output of the comparator(s) for an incorrect key combination.

In some exemplary embodiments of present disclosure, a miter-like circuit(s) can be configured to determine the DIP(s). A scrambler(s) can be connected to an input of the comparator(s). The scrambler(s) can be configured to provide the key value(s) to the comparator(s). The scrambler(s) can be further configured to corrupt an output of the comparator(s) for an incorrect key combination.

Another exemplary embodiment of the present disclosure can include, for example, an exemplary system, method and computer-accessible medium for logic locking a circuit(s), which can include, for example, receiving a distinguishing input pattern(s) ("DIP") and a key value(s) thereto using a comparator(s) of a logic-locking circuit(s), where the logic-locking circuit(s) can include a logic gate(s) connected to an output of the comparator(s), and limiting a discriminating ability of every one of the DIP to a predetermined constant number of incorrect keys. The logic-locking circuit(s) can further include a masking unit(s) between the comparator(s) and the logic gate(s), which can be configured to prevent a flipped signal inputted into the comparator from being asserted for a correct key value(s). The logic gate(s) can include an XOR gate(s). The key value(s) can be provided to the comparator(s) using a scrambler(s) of the logic-locking circuit(s).

In certain exemplary embodiments of the present disclosure, the DIP(s) can be received by a logic cone(s). An output of the logic cone(s) can be corrupted for, at most, a further predetermined constant number of DIPs for every incorrect key value. The output of logic cone(s) can be corrupted using the logic gate(s). An input signal(s) to the comparator(s) can be flipped based on a combination of the DIP(s) and the key value(s). The DIP(s) can be determined using a miter-like circuit(s). An input(s) to the comparator(s) can be scrambled.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments illustrating the present disclosure, in which:

FIGS. 1A-1C are exemplary circuit diagrams of logic locking using XOR/XNOR gates;

FIG. 2 is an exemplary circuit diagram of a Miter-like circuit used to determine distinguishing input patterns according to an exemplary embodiment of the present disclosure;

FIG. 3 is an exemplary table illustrating an analysis of a SAT attack against logic locking according to an exemplary embodiment of the present disclosure;

FIG. 4 is an exemplary table illustrating the results of resisting a SAT attack according to an exemplary embodiment of the present disclosure;

Figure 5:
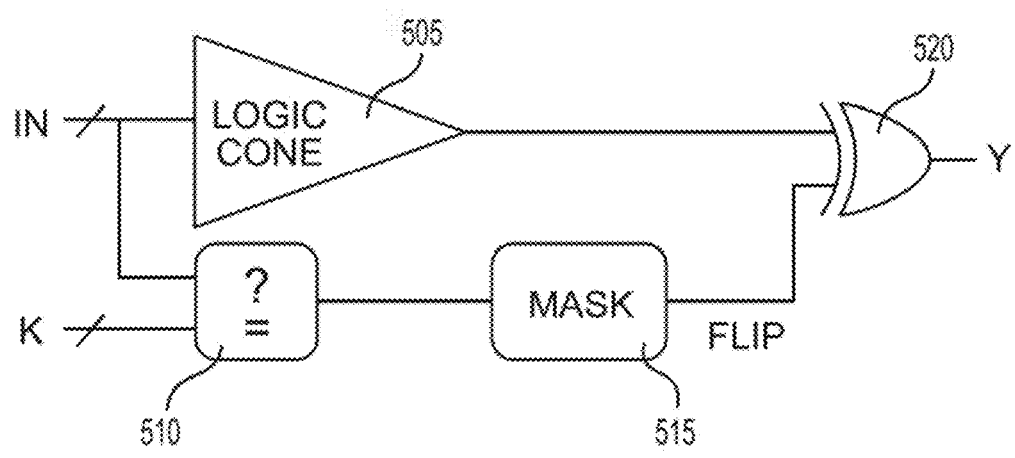
FIG. 5 is an exemplary circuit diagram of a SAT attack-resistant circuit according to an exemplary embodiment of the present disclosure.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

Exemplary SAT Attack

A SAT attack can iteratively rule out incorrect key values using DIPs. (See, e.g., Reference 15). A DIP $X_d$ can be an input value for which at least two different key values, k1 and k2, can produce differing outputs, o1 and o2, respectively. Since o1 and o2 can be different, at least one of the key values, or both of them, can be incorrect. It can be possible for a single DIP to rule out multiple incorrect key values.

The DIPs can be found by constructing a miter-like circuit, as illustrated in the circuit diagram of FIG. 2. The primary inputs 205 can be common to the two circuit copies 210 and 215 of the locked circuit, while the key inputs can be left independent. The corresponding outputs 220 of the two circuit copies 210, 215 can be XORed, and then ORed, to generate a different signal 225. The Conjunctive Normal Form ("CNF") of the resultant circuit can be generated, and can be passed to a SAT solver. The SAT solver can find a DIP $X_d$ for which diff=1; for example, the outputs of the two circuits can be different. $X_d$ can be applied to the functional IC, and correct output $I_d$ can be obtained. The input-output pair (e.g., $X_d$, $I_d$) can be used to identify incorrect key values. However, a single pattern may not rule out all incorrect keys. To exclude the remaining incorrect key values, more distinguishing patterns can be needed. A new pair (e.g., $X_d$, $I_d$) can be added to the SAT formula in each iteration, and the SAT formula can be updated. The attack can be successful when no further DIPs can be found, which can imply that all incorrect key values have been pruned.

For example, the application of the SAT attack on the locked circuit shown in FIGS. 1A-1C can be considered. In particular, FIG. 1A shows an exemplary circuit diagram of an exemplary circuit having a majority of inputs applied. FIG. 1B illustrates an exemplary circuit diagram of an exemplary circuit locked using XOR/XNOR key gates, where the correct key value is 110. FIG. 1C illustrates an exemplary circuit diagram of an exemplary circuit locked using inverters absorbed by key gates, where the correct key value is 110.

FIG. 3 illustrates an exemplary table of an exemplary output of the original circuit in column Y, and an exemplary output of the locked circuit for different key values in the following columns. For three key inputs, eight possible key values can be provided, which can be represented as k0, k1, . . . , k7. When the SAT attack is launched on the locked circuit, it can take four DIPs to identify the correct key. (See, e.g., Reference 15). In iteration 1, a DIP of 011 can be used. For this DIP, the key value k4 alone can produce a wrong output. (See, e.g., element 305 of FIG. 3). Thus, e.g., only one incorrect key can be ruled out in the first iteration. In the second and third iterations, key values k1 and k7 can be ruled out, using the patterns 111 and 101, respectively.

The pattern 100, used in the fourth iteration, can eliminate all incorrect keys, and the attack can successfully identify the correct key as k0.

The attack may have succeeded in the first iteration with a single DIP of 100, if this input pattern was tried first. Thus, the execution time of the attack can depend on the order in which the input patterns can be applied for the SAT attack. The SAT attack, however, can choose the DIPs arbitrarily. (See, e.g., Reference 15). The larger the number of incorrect key values excluded per DIP, the fewer the patterns needed for the attack. The exemplary number of DIPs ("# DIPs") for a successful attack can be used as a metric for evaluating the resilience of a logic locking procedure against the exemplary SAT attack.

Exemplary Resisting the SAT Attack

The SAT attack can be successful against existing logic locking procedures as the # DIPs needed for the attack against these procedures can be relatively small (e.g., about 250 or fewer patterns can be needed for a successful attack on about 90% of the circuits examined). (See, e.g., Reference 15). Existing logic locking procedures can also fail to take into account the discriminating ability of individual input patterns, and can be vulnerable to the SAT attack. For example, as shown in FIG. 3, all incorrect key values k1-k7 can produce an incorrect output for the DIP 100, and the SAT attack can identify the correct key value using a single input pattern. This can represent the best-case scenario for the SAT attack.

The worst-case scenario for the SAT attack can arise when the attack can discriminate at most one incorrect key value with each DIP. The truth table shown in FIG. 4 illustrates SAT attack resistant locking for three primary inputs and three key inputs. In each row, there can be, for example, at most one key value that can generate an incorrect output. As shown in the truth table of FIG. 4, when the SAT attack can be launched on a circuit with |K| key bits, # DIPs$\geq 2^{|K|}-1$. Thus, the attack effort can grow exponentially with |K|.

Exemplary SARLock: SAT Attack-Resilient Logic Locking

Figure 6:
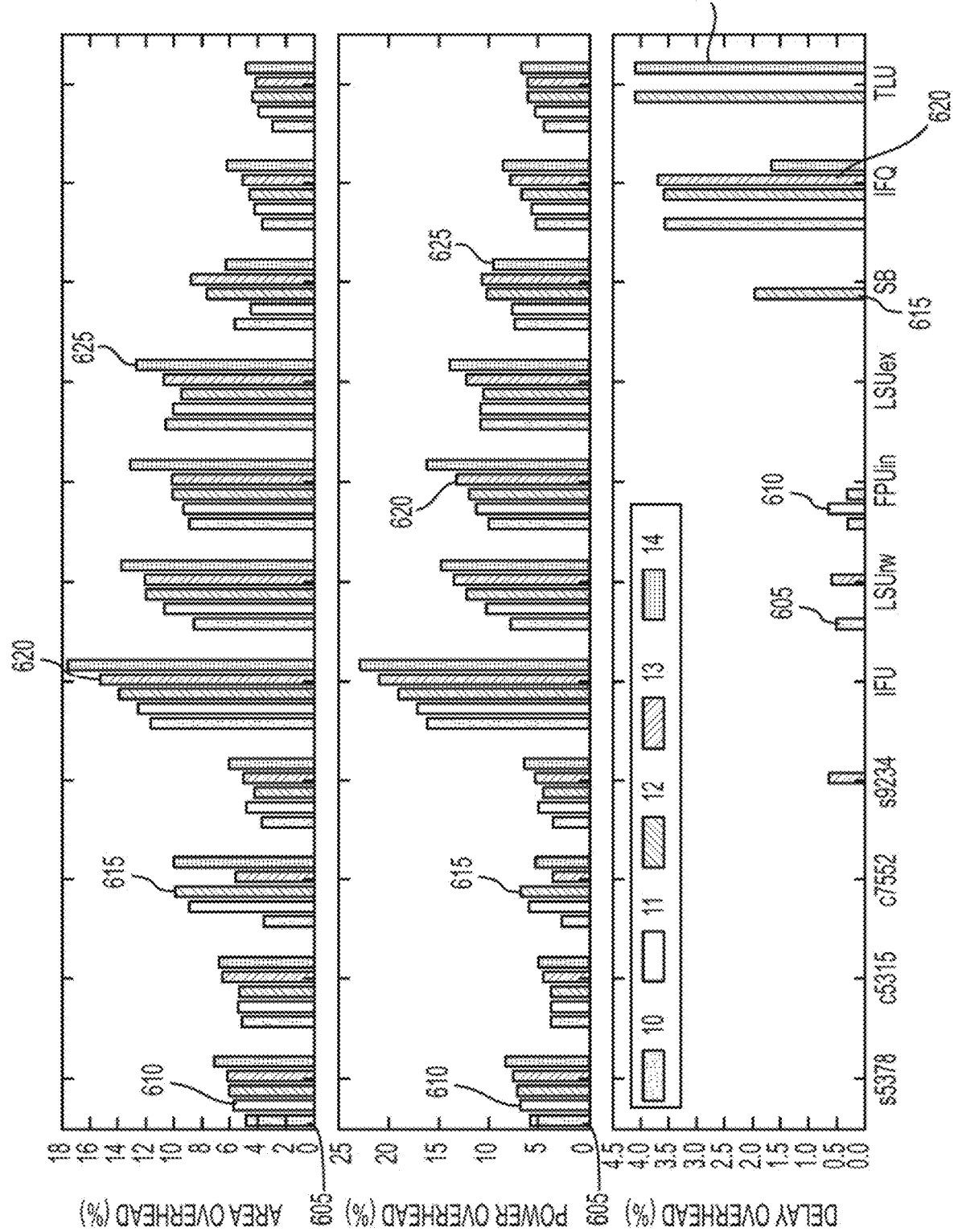
FIG. 6 is a set of exemplary graphs illustrating area, power and delay overhead of an exemplary SAT-Attack Resistant Logic Locking according to an exemplary embodiment of the present disclosure.

To generate/build/provide an exemplary SAT attack resistant circuit that can implement a truth table, which can be similar to the exemplary table shown in FIG. 4, in a lightweight and scalable fashion, a small circuit can be used according to an exemplary embodiment of the present disclosure. FIG. 5 shows a circuit, which can be used to implement the truth table shown in FIG. 4. For example, as shown in FIG. 5, the primary inputs that normally drive logic cone 505 can also be input into comparator 510. A secret key K can also be input into the comparator 510 in FIG. 5. The exemplary comparator 510 can generate a flip signal (e.g., using a masking unit 515) that can be asserted for specific input and key value combinations. The flip signal can be XORed (e.g., using XOR gate 520) with one of the primary outputs of logic cone 505 as shown in the circuit diagram of FIG. 5. Thus, every incorrect key can flip the output of the logic cone for exactly one input pattern. To prevent the flip signal from being asserted for the correct key value, such as 110, or K6, shown in FIG. 4, masking unit 515 can be used. The resulting exemplary locked circuit can achieve the desired resistance against the SAT attack with minimal overhead. The SAT attack can eliminate at most one incorrect key in each of its iterations, requiring a number of iterations that can be exponential in the size of the key. FIG. 6 shows a set of exemplary graphs illustrating the area, power and delay overhead of SARLock for different values of |K| according to an exemplary embodiment of the present disclosure. The exemplary |K| values shown in FIG. 6 are as follows:

|K|=10 (e.g., element 605),
|K|=11 (e.g., element 610),
|K|=12 (e.g., element 615),
|K|=13 (e.g., element 620),
|K|=14 (e.g., element 625).

As an example, for |K| key bits, the additional logic can include |K|+1 two-input XOR/XNOR gates and 2|K|+1 two-input AND gates. Upon an increasing of the key size, |K|, the area overhead can grow linearly, while there can be an exponential increase in the # DIPs.

Exemplary SARLock Results

The following description indicates the effectiveness of the exemplary SARLock against the SAT attack using empirical attack results. The exemplary SARLock with strong logic locking ("SLL") (see, e.g., Reference 8) was compared against existing (e.g., SAT attack vulnerable) logic locking procedures. The SLL can offer the best resilience to the other attacks on logic locking. (See, e.g., References 6, 8, 12 and 14).

Table I below illustrates the # DIPs and the execution time of the attack on SLL (see, e.g., Reference 8) for different key sizes |K|. SLL can be broken with only a few DIPs. Moreover, the execution time of the attack can be below one second for all the benchmark circuits, which can demonstrate how vulnerable SLL (see, e.g., Reference 8) and existing locking procedures can be to the SAT attack.

TABLE I

DIPs and the execution time (s) of the SAT attack [15] to break SLL [8] for different values of |K|.

| Benchmark | # DIPs | | | | | Execution time (s) | | | | |
|---|---|---|---|---|---|---|---|---|---|---|
| | 10 | 11 | 12 | 13 | 14 | 10 | 11 | 12 | 13 | 14 |
| s5378 | 8 | 9 | 9 | 10 | 13 | 0.2 | 0.2 | 0.2 | 0.2 | 0.2 |
| c5315 | 4 | 3 | 4 | 5 | 3 | 0.3 | 0.3 | 0.3 | 0.3 | 0.3 |
| c7552 | 8 | 9 | 9 | 9 | 12 | 0.7 | 0.5 | 0.5 | 0.5 | 0.5 |
| s9234 | 7 | 13 | 13 | 10 | 12 | 0.2 | 0.3 | 0.3 | 0.3 | 0.3 |
| IFU | 8 | 8 | 9 | 13 | 11 | 0.1 | 0.1 | 0.1 | 0.1 | 0.1 |
| LSUrw | 4 | 5 | 5 | 7 | 9 | 0.1 | 0.1 | 0.1 | 0.1 | 0.1 |
| FPUin | 6 | 7 | 8 | 5 | 9 | 0.1 | 0.1 | 0.1 | 0.1 | 0.1 |
| LSUex | 5 | 5 | 8 | 8 | 6 | 0.1 | 0.1 | 0.1 | 0.1 | 0.1 |
| SB | 7 | 5 | 6 | 6 | 6 | 0.1 | 0.1 | 0.1 | 0.1 | 0.1 |
| IFQ | 9 | 7 | 9 | 9 | 8 | 0.2 | 0.2 | 0.2 | 0.2 | 0.2 |
| TLU | 7 | 6 | 7 | 9 | 10 | 0.3 | 0.3 | 0.4 | 0.3 | 0.4 |

In contrast to SLL, the exemplary SARLock can exhibit a strong resilience against the SAT attack. As shown in Table II below, the # DIPs for SARLock grows exponentially with |K| across all the benchmarks. While the # DIPs doubles with each increment in |K|, the change in execution time can be higher (e.g., about ~3× to 4× for most of the circuits). The execution time can vary across the benchmark circuits, because the number of clauses in the SAT formula of each circuit can be different. Although the exemplary key size |K| used in Table I and Table II can be small, these key sizes can be considered for comparing # DIPs and execution time of the SAT attack empirically. While the attack can complete within a minute for most circuits for |K|=10, the attack takes about 4-5 hours for the OpenSPARC controller circuits for |K|=14.

TABLE II

DIPs and the execution time (s) of the SAT attack [15]
to break SARLock for different values of |K|.

| Benchmark | # DIPs | | | | | Execution time (s) | | | | |
|---|---|---|---|---|---|---|---|---|---|---|
| | 10 | 11 | 12 | 13 | 14 | 10 | 11 | 12 | 13 | 14 |
| s5378 | 1023 | 2047 | 4095 | 8191 | 16383 | 62.6 | 177.9 | 996.1 | 2710.2 | 9374.6 |
| c5315 | 1023 | 2047 | 4095 | 8191 | 16383 | 79.6 | 247.4 | 1188.1 | 3441.4 | 11122.5 |
| c7552 | 1023 | 2047 | 4095 | 8191 | 16383 | 73.1 | 311.1 | 1276.6 | 3561.3 | 11761.5 |
| s9234 | 1023 | 2047 | 4095 | 8191 | 16383 | 77.7 | 279.0 | 1235.2 | 3491.2 | 12330.9 |
| IFU | 1023 | 2047 | 4095 | 8191 | 16383 | 32.5 | 104.3 | 589.6 | 2216.8 | 6650.8 |
| LSUrw | 1023 | 2047 | 4095 | 8191 | 16383 | 37.3 | 120.5 | 618.0 | 1762.8 | 6133.0 |
| FPUin | 1023 | 2047 | 4095 | 8191 | 16383 | 34.9 | 112.8 | 650.0 | 1898.6 | 6390.0 |
| LSUex | 1023 | 2047 | 4095 | 8191 | 16383 | 36.0 | 130.4 | 690.4 | 1941.0 | 7104.9 |
| SB | 1023 | 2047 | 4095 | 8191 | 16383 | 50.8 | 149.3 | 825.2 | 2412.9 | 7845.9 |
| IFQ | 1023 | 2047 | 4095 | 8191 | 16383 | 67.9 | 232.6 | 1135.9 | 2958.1 | 10521.1 |
| TLU | 1023 | 2047 | 4095 | 8191 | 16383 | 81.2 | 271.7 | 1198.7 | 3341.4 | 11628.5 |

Figure 8:
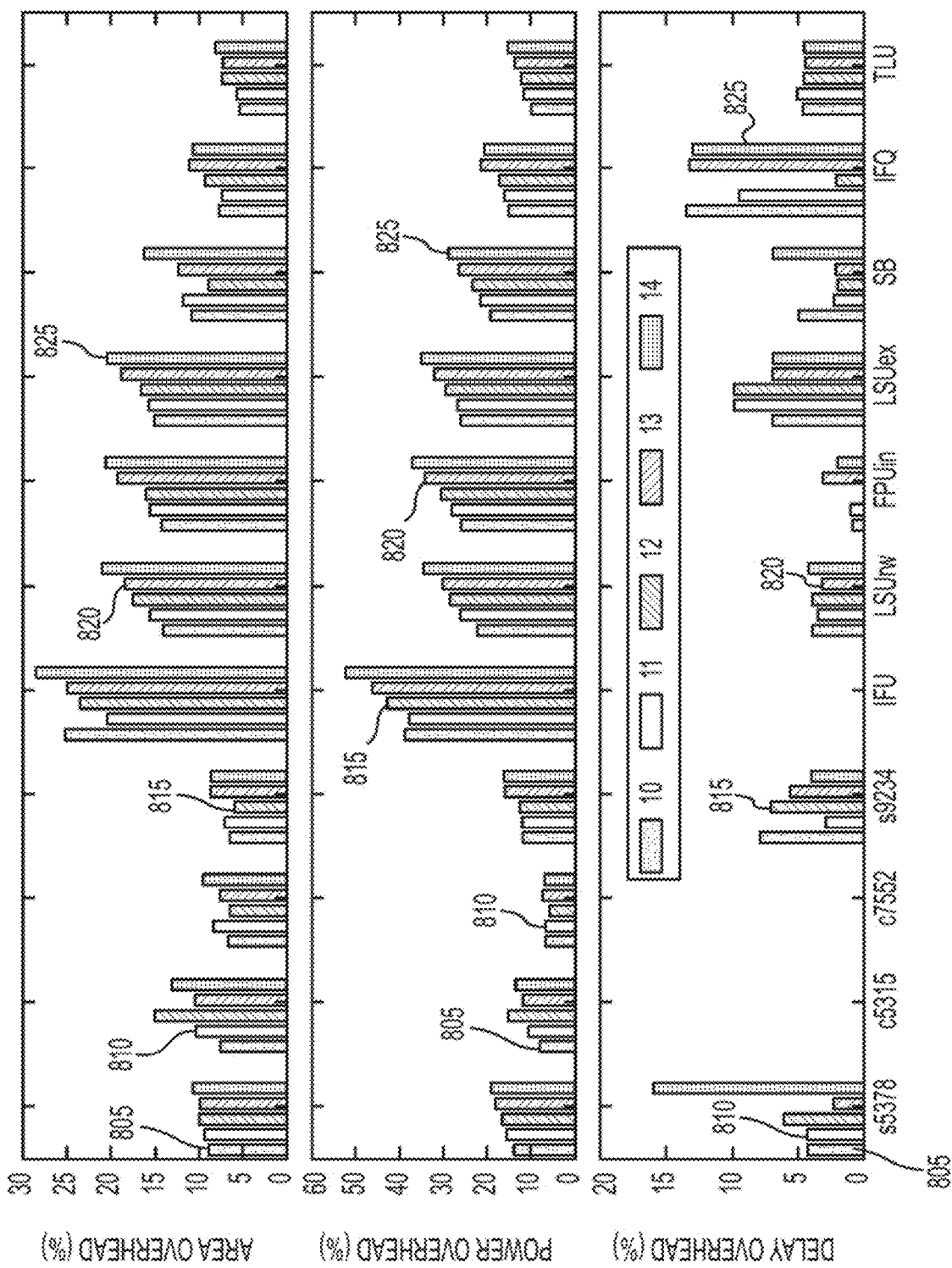
FIG. 8 is a set of exemplary graphs illustrating area, power and delay overhead of an exemplary SAT-Attack Resistant Logic Locking and strong logic locking according to an exemplary embodiment of the present disclosure.

FIG. 8 shows a set of exemplary graphs that illustrate the area and power overhead of SARLock increase linearly with |K|, as the number of gates inserted by SARLock can grow linearly with |K|. However, the benefit from the security perspective can be exponential. The average delay overhead of SARLock can be less than about 0.7%. The exemplary |K| values shown in FIG. 8 are as follows:

|K|=10 (e.g., element 805),
|K|=11 (e.g., element 810),
|K|=12 (e.g., element 815),
|K|=13 (e.g., element 820),
|K|=14 (e.g., element 825).

Exemplary Provably Secure Obfuscation

A security analysis of the exemplary SARLock, from the provable obfuscation perspective, according to an exemplary embodiment of the present disclosure, is described below. The inputs to this logic block can be primary input IN and the key input K, while the output can be a single bit called flip. This logic block can be represented as the Boolean function flip=F(IN, K).

For each incorrect key guess, $K_{incorr}$, to the SARLock block, the output bit can be different at only one input with respect to the correct key input $K_{corr}$. Thus, the function $F(IN, K_{corr}) \oplus F(IN, K_{corr}\alpha)$, $\alpha \in \{0, 1\}^n \setminus \{0^n\}$ can be a one-point function. An incorrect key $K_{incorr}$ can be defined as $K_{corr} \oplus \alpha$. The implementation of this one-point function can be provably obfuscated, given that the attacker can have no advantage beyond having a black-box access to the implemented netlist. (See, e.g., Reference 18). For example, the one-point function can be obfuscated as, for example:

$$F(IN, K_{corr}) \oplus F(IN, K_{corr} \oplus \alpha) = \begin{cases} 1, & \text{if } r^{IN} = r^{K_{corr}\oplus\alpha} \\ 0, & \text{otherwise} \end{cases}$$

In the exponentiation operation, r can be a generator of a multiplicative cyclic group G and IN, $K_{corr}\oplus\alpha$ can be elements of G. If the chosen family of groups can be $\mathbb{Z}_p^*$, where p and q can be primes, and p=2q+1, then recovering $K_{corr}\oplus\alpha$ from $r^{K_{corr}\oplus\alpha}$ can become a discrete logarithm ("DL") problem. For large sizes of the primes p and q (e.g., 1024 bits), the DL problem can be computationally hard. Thus, an attacker may not be able to extract $K_{corr}\oplus\alpha$ from $r^{K_{corr}\oplus\alpha}$. Under a variant of decisional Diffie-Hellman ("DDH") assumption, (see, e.g., Reference 19), this construction can provably satisfy the strong definition of obfuscation. Thus, this exemplary procedure can be used to hide $K_{corr}$ in the logic block F. However, the implementation of 1024-bit modular exponentiation can incur a large area overhead (see, e.g., Reference 20) and can be impractical.

The exemplary SARLock can successfully thwart the SAT attack (see, e.g., Reference 15); however, it may not be able to protect against other existing attacks, such as the removal attack and the sensitization attack (see, e.g., Reference 10). In removal attacks, for instance, an attacker can identify the components/gates that belong to the lock circuitry, and can remove them from the locked netlist. An attacker can obtain the locked netlist either by reverse engineering it, or by stealing it from the design house. Since, the exemplary SARLock logic can be isolated and not intertwined with the original circuit, the attacker can easily separate it from the original circuit. To defend against such attacks, SARLock can be coupled to other defenses.

Exemplary Two-Layer Logic Locking

To provide protection against a wide spectrum of attacks, the exemplary SARLock can be integrated with an existing logic locking procedure (see, e.g., References 8, 10 and 13) that can be resilient against reverse engineering attacks. From the existing SAT attack, vulnerable logic locking procedures, SLL (see, e.g., Reference 8) can be chosen, since SLL can have the maximum protection against known attacks. (See, e.g., References 6, 8, 12 and 14). SLL can insert XOR/XNOR key-gates with increased interference among them, and can protect a circuit from reverse engineering and sensitization attacks. (See, e.g., Reference 8). By intertwining the functional gates and the key gates, SLL can hide the implementation of a netlist, thwarting the removal attack. To lock a particular circuit output, the exemplary SARLock+SLL can be used, which can integrate SARLock with SLL. Given |K|=|K1|+|K2| key bits, SARLock+SLL can (i) lock the logic cone (e.g., transitive fan-in of the output) with SLL using |K1| key bits, and (ii) scramble K2 with K1, and protect the circuit with SARLock using the scrambled K2 bits.

The exemplary key K1 can have two roles, for example, it can (i) function as the key for SLL, and/or (ii) scramble the key K2. Scrambling K2 can be beneficial, since otherwise, most or all the flips can occur in pre-determined combinations of input and key values. Moreover, the scrambler can create a dependency between the K1 and K2, thwarting the removal attack. The exemplary SARLock+SLL is illustrated in the circuit diagram shown in FIG. 7.

Figure 7:
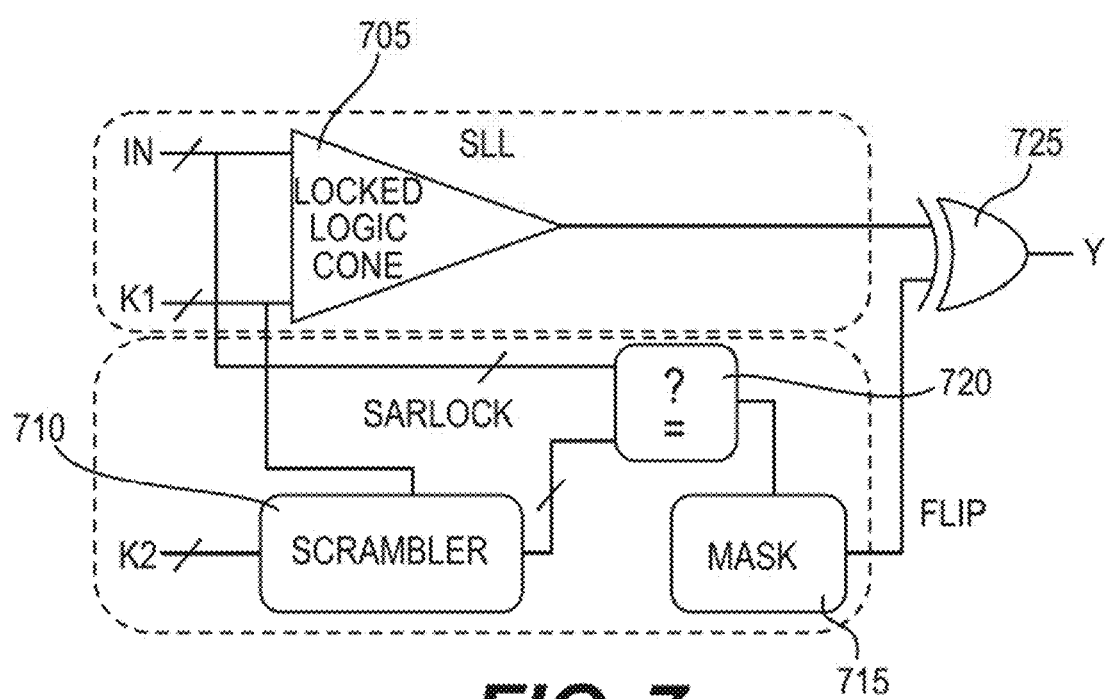
FIG. 7 is an exemplary circuit diagram of an exemplary SAT-Attack Resistant Logic Locking and strong logic locking for two-layer locking according to an exemplary embodiment of the present disclosure.

For example, as shown in FIG. 7, a secret K1 value can be input into locked logic cone 705, the output of which can be XORed (e.g., using XOR gate 725). The K1 value and a K2 value can be input into scrambler 710, which can produce the scrambled key to the comparator 720. The comparator 720 can compare the scrambled key with the primary inputs of the logic cone 705 to assert the flip signal whenever there can be a match. The flip can be suppressed by the masking unit 715 for the correct key. The flip signal can be XORed with the output signal from the locked logic cone 705 using XOR gate 725 in order to corrupt the output of the logic cone for any incorrect key.

The scrambler logic can be selected by the designer based on the permissible overheads. For instance, a bus-based IC protection procedure (see, e.g., Reference 21) can authorize activation of each individual chip by leveraging bit permutations as scrambler for the bus data using a key unique to each IC. Other procedures can include logic locking procedures (see, e.g., Reference 14), such as XOR gates, arithmetic transformations, such as addition and subtraction, bit permutations using Benes network, and crossbar switches. (See, e.g., References 21 and 22).

Exemplary Protection Against Attacks

The exemplary scrambler can perform mixing of the keys K1 and K2 to prevent the comparator and the mask circuits from leaking explicit information about K1 and K2. The attacker needs to determine the value of K1 to recover K2 from the scrambler. To determine K1, the attacker needs to perform a SAT attack on the locked logic cone. This can depend on K2 as the IC's output can be a function of both K1 and K2, and K2 can be the key for the SARLock circuit that can resist the SAT attack. The circular dependency can thwart the removal attacks, as well as facilitate the exemplary SARLock+SLL to inherit the protection that SLL can provide against sensitization attacks. (See, e.g., Reference 8).

Exemplary Two-Layer Logic Locking Results

For the SAT attack on the exemplary SARLock+SLL, it can be assumed that |K1|=|K2|=|K|/2. Table III below illustrates the # DIPs for different values of |K2|. Since, SLL can be broken with a small # DIPs (see, e.g., Reference 8), the # DIPs can be increased minimally by integrating with SLL. (See, e.g., Reference 8). Table III also shows that the execution time of the SAT attack on SARLock+SLL can be, on average, about 1.29 times higher than that for SARLock alone.

The average area, power and delay overhead for SAR-Lock+SLL can be about 21.27%, about 33.3%, and about 4.95%, respectively, for |K2|=14. As shown in FIG. 8, the overhead grows linearly with |K2|. The average delay overhead for SARLock+SLL can be, however, higher as compared to SARLock alone.

Table IV below illustrates a comparison of the exemplary SARLock+SLL with existing locking logic procedures, random logic locking ("RLL") (see, e.g., Reference 13) and SLL (see, e.g., Reference 8), for |K|=64. While the SAT attack (see, e.g., Reference 15) can break RLL (see, e.g., Reference 13) and SLL (see, e.g., Reference 8) within about a second, it can take about $3.1 \times 10^9$ seconds (e.g., approximately 100 years) to break SARLock+SLL. The average area, power and delay overhead of SARLock+SLL can be about 35.2%, about 61% and about 9.3% respectively, which can be comparable to that of RLL and SLL. (See, e.g., References 8 and 13).

TABLE IV

Comparison of SARLock + SLL with RLL [13] and SLL [8] for |K| = 64. #DIPs and execution time are extrapolated based on empirical data.

|  | RLL [13] | SLL [8] | SARLock + SLL |
|---|---|---|---|
| #DIPs | 19 | 26 | 4.3E09 |
| Exec. time (s) | 0.4 | 0.7 | 3.1E09 |
| Area (%) | 29.6 | 32.2 | 35.2 |
| Power (%) | 45.0 | 59.2 | 61.0 |
| Delay (%) | 15.1 | 17.2 | 9.3 |

Exemplary Discussion

Exemplary SAT Attack Resistance Vs. Corruptibility:

SARLock can thwart the SAT attack by corrupting/flipping the output bits selectively, which can result in a small Hamming distance ("HD") at the outputs on applying incorrect keys. (See, e.g., Reference 10). There can be a dichotomy between the two security metrics, # DIPs and HD. A designer can decide the optimal values of the # DIPs and the HD, based on the application and the threat model. SARLock can be suitable for protecting the output of the control units in microprocessors, where a single bit flip can vastly corrupt the overall sequence of operations. (See, e.g., Reference 23).

Exemplary Flipping Multiple Output Bits:

SARLock can protect the critical logic cones in a circuit while offering the maximum resistance to the SAT attack. Flipping multiple output bits simultaneously can increase the HD, and should be traded off carefully with the # DIPs.

Exemplary Choice of the Key Sizes:

SLL can maximize the clique size in a graph of key gates, which can dictate |K1|. The desired # DIPs can dictate |K2|.

TABLE III

DIPs and the execution time (s) of the SAT attack [15] to break SARLock + SLL different values of |K2|.

| | # DIPs | | | | | Execution time (s) | | | | |
|---|---|---|---|---|---|---|---|---|---|---|
| Benchmark | 10 | 11 | 12 | 13 | 14 | 10 | 11 | 12 | 13 | 14 |
| s5378 | 1024 | 2048 | 4096 | 8191 | 16384 | 54.1 | 199.6 | 619.7 | 4351.8 | 10250.7 |
| c5315 | 1024 | 2049 | 4096 | 8191 | 16383 | 75.4 | 252.9 | 829.1 | 4778.2 | 15874.9 |
| c7552 | 1025 | 2049 | 4096 | 8191 | 16186 | 78.3 | 234.1 | 757.0 | 3165.3 | 14573.1 |
| s9234 | 1027 | 2049 | 4102 | 8195 | 16386 | 77.2 | 247.9 | 864.1 | 3225.7 | 15532.3 |
| IFU | 1023 | 2056 | 4100 | 8206 | 16389 | 55.2 | 166.7 | 789.5 | 2309.8 | 10258.7 |
| LSUrw | 1025 | 2049 | 4096 | 8194 | 16383 | 58.2 | 152.0 | 626.9 | 1802.6 | 7466.6 |
| FPUin | 1025 | 2049 | 4097 | 8194 | 16384 | 28.4 | 135.0 | 1359.6 | 4497.6 | 15457.2 |
| LSUex | 1024 | 2049 | 4096 | 8194 | 16384 | 52.8 | 268.3 | 1137.2 | 3101.4 | 16707.1 |
| SB | 1026 | 2050 | 4099 | 8194 | 16386 | 69.2 | 257.4 | 1416.6 | 3304.6 | 19193.7 |
| IFQ | 1024 | 2048 | 4098 | 8192 | 16384 | 63.3 | 290.8 | 1644.7 | 4185.4 | 14563.1 |
| TLU | 1027 | 2052 | 4099 | 8195 | 16385 | 57.2 | 227.0 | 2238.7 | 3507.6 | 18760.3 |

Exemplary Low-Overhead SARLock:

To reduce the overhead, SARLock can be selectively applied on only particular (e.g., important) parts of the design. Controllers typically represent the most valuable IP in processors, while at the same time occupying a small area (e.g., approximately 1%). (See, e.g., Reference 24). In resource-constrained settings, protecting the controllers alone can help achieve the security objectives with a minimal overhead on the overall system.

Exemplary Logic Locking Procedures

Random logic locking can insert XOR/XNOR key gates at random locations in a netlist. (See, e.g., Reference 13). Fault analysis based logic locking can address the limitations of RLL and can lock an IC such that a random incorrect key can corrupt the maximum number of output bits. (See, e.g., Reference 10). Strong logic locking can insert key gates such that it can be difficult to sensitize key bits to primary outputs on an individual basis. (See, e.g., Reference 8).

Exemplary Attacks Against Logic Locking

Table V below illustrates a summary of existing attacks against logic locking and the corresponding threat models. The sensitization attack can generate key-leaking input patterns by analyzing the locked netlist. These patterns can be applied to the functional IC to sensitize the key bits to the primary outputs. (See, e.g., Reference 8). The logic cone analysis attack can be based on a divide-and-conquer approach. (See, e.g., Reference 6). It can identify the logic cone with the smallest number of key bits, and can employ brute force to recover the secret key. SARLock can be complemented with SLL to defend against these attacks.

TABLE V

Comparing logic locking threat models.

| Attack | Attacker's assets | Attack method |
|---|---|---|
| Sensitization [8] | 1) Locked netlist 2) Activated IC | Sensitization of key bits to outputs |
| Logic cone analysis [6] | 1) Locked netlist 2) Activated IC | Brute force on individual logic cones |
| SAT [15] | 1) Locked netlist 2) Activated IC | SAT-based algorithm that rules out incorrect keys iteratively |
| Hill climbing [12] | 1) Locked netlist 2) Test patterns and responses | Key bit flipping guided by the Hamming distance between test response and circuit output |

The SAT attack can use Boolean satisfiability procedures to prune the incorrect key candidates. (See, e.g., Reference 15). The hill climbing search attack can use test data information to guess the secret key for ICs that can be activated prior to the manufacturing test. (See, e.g., Reference 12). Unlike the SAT attack where an attacker can choose I/O pairs in the test data set, SARLock can defend against the hill-climbing attack, since it can increase the # DIPs to be greater than the number of I/O pairs in the test data set. (See, e.g., Table II and Table III).

As described above, the exemplary system, method and computer-accessible medium, according to an exemplary embodiment of the present disclosure (e.g., SARLock+ SLL), can thwart key distinguishing attacks, and in particular, the SAT attack (see, e.g., Reference 15), in addition to thwarting all the attacks that SLL can protect against. (See, e.g., References 8 and 12). SARLock+SLL can increase the number of distinguishing input patterns exponentially with the key size by reducing the number of distinguishing input patterns exponentially with the key size, and by reducing the number of key values filtered in each iteration of the attack. Thus, the execution time of the attack can grow exponentially with the key size. The extra hardware inserted by the exemplary procedure can be provably obfuscated to resist reverse engineering attacks.

Figure 9:
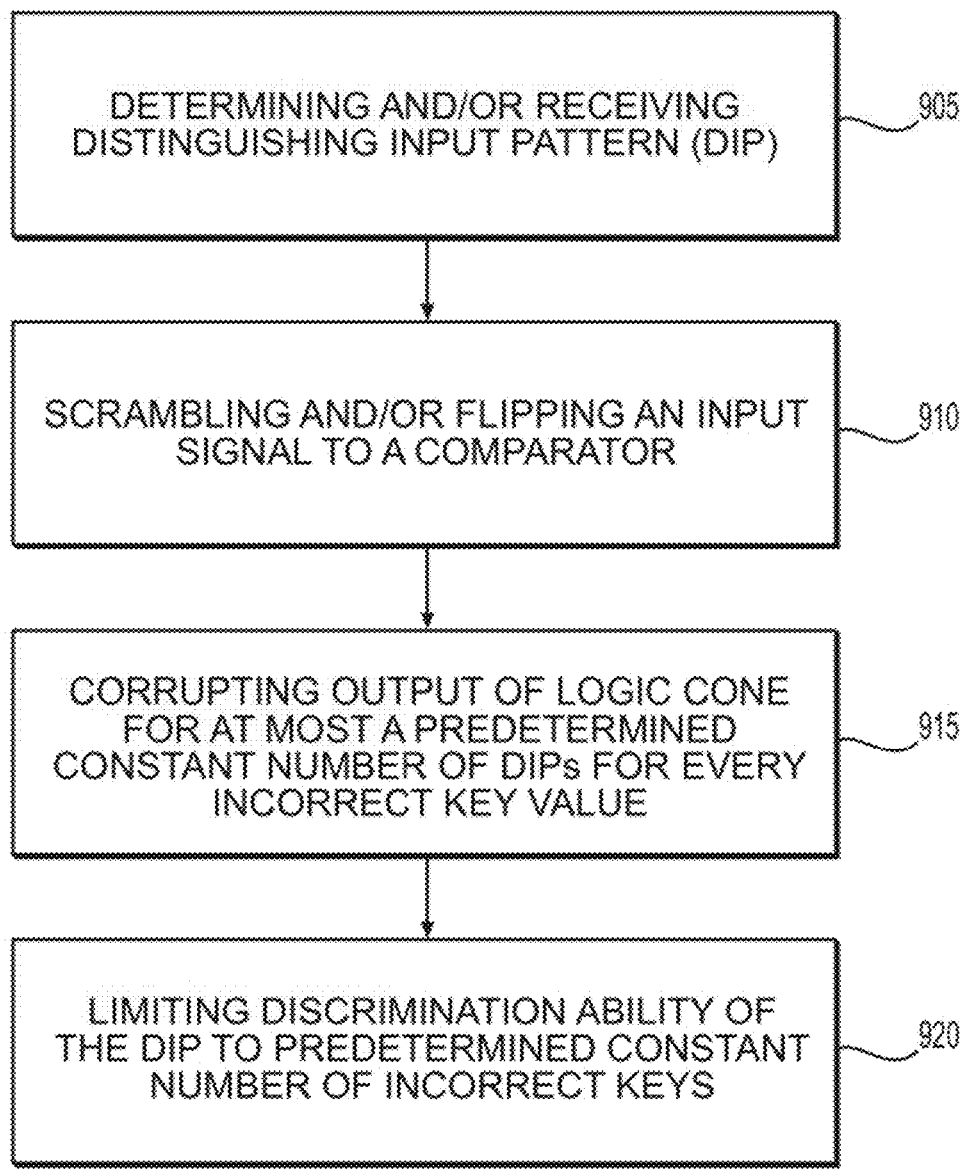
FIG. 9 is an exemplary flow diagram of a method for logic locking a circuit according to an exemplary embodiment of the present disclosure.
Figure 10:
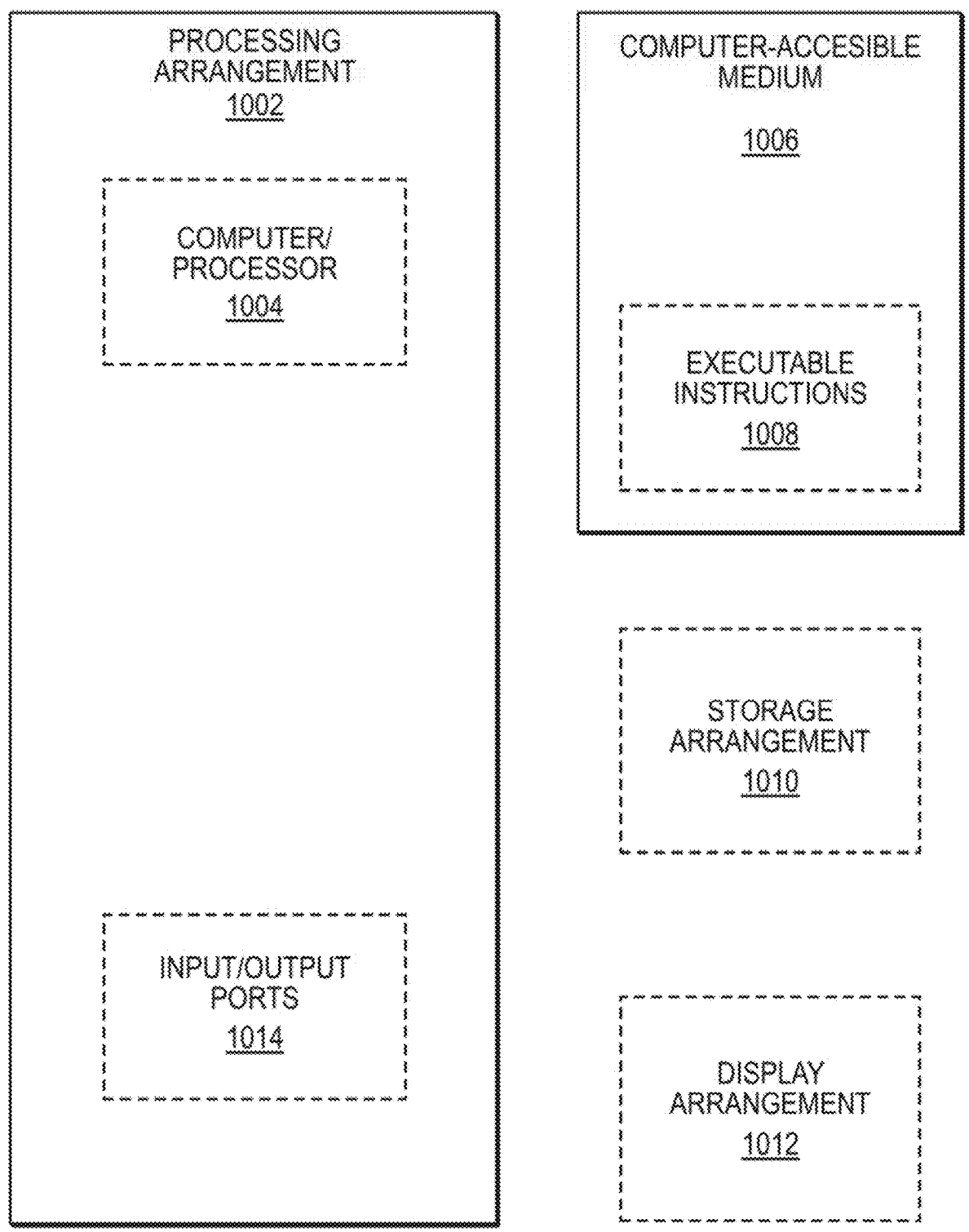
FIG. 10 is an illustration of an exemplary block diagram of an exemplary system in accordance with certain exemplary embodiments of the present disclosure.

FIG. 9 shows an exemplary flow diagram of a method 900 for logic locking of a circuit according to an exemplary embodiment of the present disclosure. For example, at procedure 905, a DIP can be determined and/or received by a comparator. At procedure 910, an input signal to the comparator can be scrambled and/or flipped. At procedure 915, the output of a logic cone can be corrupted for at most a predetermined number of DIPS for every correct key value, At procedure 920, the discrimination ability of the DIP can be limited to a predetermined constant number of incorrect keys FIG. 10 shows a block diagram of an exemplary embodiment of a system according to the present disclosure. For example, exemplary procedures in accordance with the present disclosure described herein can be performed by a processing arrangement and/or a computer arrangement 1002. Such processing/computer arrangement 1002 can be, for example entirely or a part of, or include, but not limited to, a computer/processor 1004 that can include, for example one or more microprocessors, and use instructions stored on a computer-accessible medium (e.g., RAM, ROM, hard drive, or other storage device).

As shown in FIG. 10, for example a computer-accessible medium 1006 (e.g., as described herein above, a storage device such as a hard disk, floppy disk, memory stick, CD-ROM, RAM, ROM, etc., or a collection thereof) can be provided (e.g., in communication with the processing arrangement 1002). The computer-accessible medium 1006 can contain executable instructions 1008 thereon. In addition or alternatively, a storage arrangement 1010 can be provided separately from the computer-accessible medium 1006, which can provide the instructions to the processing arrangement 1002 so as to configure the processing arrangement to execute certain exemplary procedures, processes and methods, as described herein above, for example.

Further, the exemplary processing arrangement 1002 can be provided with or include an input/output arrangement 1014, which can include, for example a wired network, a wireless network, the internet, an intranet, a data collection probe, a sensor, etc. As shown in FIG. 10, the exemplary processing/computer arrangement 1002 can be in communication with an exemplary display arrangement 1012, which, according to certain exemplary embodiments of the present disclosure, can be a touch-screen configured for inputting information to the processing/computer arrangement 1002 in addition to outputting information from the processing/computer arrangement 1002, for example. Further, the exemplary display 1012 and/or a storage arrangement 1010 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entireties:
[1] "Defense Science Board (DSB) study on High Performance Microchip Supply," 2005, [Mar. 16, 2015]. [Online]. Available: www.acq.osd.mil/dsb/reports/ADA435563.pdf
[2] R. Karri, J. Rajendran, K. Rosenfeld, and M. Tehranipoor, "Trustworthy Hardware: Identifying and Classifying Hardware Trojans," IEEE Computer, vol. 43, no. 10, pp. 39-46.
[3] J. Rajendran, M. Sam, O. Sinanoglu, and R. Karri, "Security Analysis of Integrated Circuit Camouflaging," in Proc. ACM/SIGSAC Conference on Computer & Communications Security, 2013, pp. 709-720.
[4] R. W. Jarvis and M. G. McIntyre, "Split Manufacturing Method for Advanced Semiconductor Circuits," March 2007, U.S. Pat. No. 7,195,931.
[5] F. Koushanfar, "Integrated Circuits Metering for Piracy Protection and Digital Rights Management: An Overview," in Proc. Great Lakes Symposium on VLSI, 2011, pp. 449-454.
[6] Y.-W. Lee, N. Touba et al., "Improving Logic Obfuscation via Logic Cone Analysis," in Proc. IEEE Latin-American Test Symposium, 2015, pp. 1-6.
[7] R. S. Chakraborty and S. Bhunia, "HARPOON: An Obfuscation-Based SoC Design Methodology for Hardware Protection," IEEE Trans. Comput.-Aided Design Integr. Circuits Syst., vol. 28, no. 10, pp. 1493-1502, 2009.
[8] J. Rajendran, Y. Pino, O. Sinanoglu, and R. Karri, "Security Analysis of Logic Obfuscation," in Proc. IEEE/ACM Design Automation Conference, 2012, pp. 83-89.
[9] A. Baumgarten, A. Tyagi, and J. Zambreno, "Preventing IC Piracy Using Reconfigurable Logic Barriers," IEEE Des. Test. Comput., vol. 27, no. 1, pp. 66-75, 2010.
[10] J. Rajendran, H. Zhang, C. Zhang, G. Rose, Y. Pino, O. Sinanoglu, and R. Karri, "Fault Analysis-Based Logic Encryption," IEEE Trans. Comput., vol. 64, no. 2, pp. 410-424, 2015.
[11] J. Rajendran, Y. Pino, O. Sinanoglu, and R. Karri, "Logic Encryption: A Fault Analysis Perspective," in Proc. Design, Automation and Test in Europe, 2012, pp. 953-958.
[12] S. M. Plaza and I. L. Markov, "Solving the Third-Shift Problem in IC Piracy With Test-Aware Logic Locking," IEEE Trans. Comput.-Aided Design Integr. Circuits Syst., vol. 34, no. 6, pp. 961-971, 2015.
[13] J. Roy, F. Koushanfar, and I. L. Markov, "EPIC: Ending Piracy of Integrated Circuits," in Proc. Design, Automation and Test in Europe, 2008, pp. 1069-1074.
[14] G. K. Contreras, M. T. Rahman, and M. Tehranipoor, "Secure Split-Test for Preventing IC Piracy by Uuntrusted Foundry and Assembly," in Proc. IEEE International Symposium on Defect and Fault Tolerance in VLSI and Nanotechnology Systems, 2013, pp. 196-203.
[15] P. Subramanyan, S. Ray, and S. Malik, "Evaluating the Security of Logic Encryption Algorithms," in Proc. IEEE International Symposium on Hardware Oriented Security and Trust, 2015, pp. 137-143.
[16] "OpenSPARC T1 Processor" 2015, [Nov. 1, 2015]. [Online]. Available: {http://www.oracle.com/technetwork/systems/opensparc/opensparc-t1-page-1444609.html}
[17] "Decryption tool binaries and benchmark circuits." 2015, [Sep. 30, 2015]. [Online]. Available: https://bitbucket.org/spramod/host15-logic-encryption}
[18] R. Canetti, "Towards Realizing Random Oracles: Hash Functions That Hide All Partial Information," in Proc. Annual International Cryptology Conference, 1997, pp. 455-469.
[19] D. Boneh, "The Decision Diffie-Hellman Problem," in Algorithmic guess the secret key for ICs that are activated prior to the Number Theory. Springer, 1998, pp. 48-63.
[20] G. D. Sutter, J.-P. Deschamps, and J. L. Iman a, "Modular Multiplication and Exponentiation Architectures for Fast RSA Cryptosystem Based on Digit Serial Computation," IEEE Trans. Ind. Electron., vol. 58, no. 7, pp. 3101-3109, 2011.
[21] J. A. Roy, F. Koushanfar, and I. L. Markov, "Protecting Bus-Based Hardware IP by Secret Sharing," in Proc. IEEE/ACM Design Automation Conference, 2008, pp. 846-851.
[22] R. Naik and D. Walker, "Large Integrated Crossbar Switch," in IEEE International Conference on Wafer Scale Integration, 1995, pp. 217-227.
[23] N. Karimi, M. Maniatakos, A. Jas, and Y. Makris, "On the Correlation between Controller Faults and Instruction-Level Errors in Modern Microprocessors," in Proc. IEEE International Test Conference, 2008, pp. 1-10.
[24] Y. Alkabani and F. Koushanfar, "Active Hardware Metering for Intellectual Property Protection and Security," in Proc. USENIX Security, 2007, pp. 291-306.

What is claimed is:

1. A logic-locking circuit, comprising:
at least one logic cone receiving at least one distinguishing input pattern (DIP);
at least one comparator receiving the at least one DIP and at least one key value; and
at least one logic gate connected to (i), an output of the at least one logic cone, and (ii) an output of the at least one comparator, and configured to corrupt the output of the at least one logic cone for at most a predetermined constant number of DIPs for every incorrect key value, based on the output of the at least one comparator.

2. The logic-locking circuit of claim 1, further comprising at least one mask connected to the at least one comparator and the at least one logic gate.

3. The logic-locking circuit of claim 1, wherein the at least one logic gate is at least one XOR gate.

4. The logic-locking circuit of claim 1, wherein the at least one comparator is configured to flip at least one input signal to the at least one comparator based on a combination of the at least one DIP and the at least one key value.

5. The logic-locking circuit of claim 4, further comprising at least one mask connected to the at least one comparator and the at least one logic gate.

6. The logic-locking circuit of claim 5, wherein the at least one mask is configured to prevent the at least one flipped signal from being asserted for a correct at least one key value.

7. The logic-locking circuit of claim 1, further comprising at least one miter-like circuit configured to determine the at least one DIP.

8. The logic-locking circuit of claim 1, further comprising at least one scrambler connected to an input of the at least one comparator.

9. The logic-locking circuit of claim 8, wherein the at least one scrambler is configured to provide the at least one key value to the at least one comparator.

10. The logic-locking circuit of claim 9, wherein the at least one scrambler is further configured to corrupt an output of the at least one comparator for an incorrect key combination.

11. A method for logic locking of at least one circuit, comprising:
receiving at least one distinguishing input pattern (DIP) and at least one key value thereto using at least one comparator of at least one logic-locking circuit, wherein the at least one logic-locking circuit includes at least one logic gate connected to an output of the at least one comparator; and
limiting a discriminating ability of every one of the DIP to a predetermined constant number of incorrect keys based on the output of the at least one comparator.

12. The method of claim 11, wherein the at least one logic-locking circuit further includes at least one masking unit between the at least one comparator and the at least one logic gate.

13. The method of claim 11, wherein the at least one logic gate includes at least one XOR gate.

14. The method of claim 11, wherein the at least one DIP is received by at least one logic cone.

15. The method of claim 14, further comprising corrupting an output of the at least one logic cone for at most a further predetermined constant number of DIPs for every incorrect key value.

16. The method of claim 15, wherein the output of the at least one logic cone is corrupted using the at least one logic gate.

17. The method of claim 11, further comprising flipping at least one input signal to the at least one comparator based on a combination of the at least one DIP and the at least one key value.

18. The method of claim 17, further comprising preventing the at least one flipped signal from being asserted for a correct at least one key value.

19. The method of claim 11, further comprising determining the at least one DIP using at least one miter-like circuit.

20. The method of claim 11, further comprising scrambling, at least one input to the at least one comparator, and corrupting an output of the at least one comparator for an incorrect key combination.

21. A system for logic locking of at least one circuit, comprising:
a computer hardware arrangement configured to:
receive at least one distinguishing input pattern (DIP) and at least one key value thereto using at least one comparator of at least one logic-locking circuit, wherein the at least one logic-locking circuit includes at least one logic gate connected to an output of the at least one comparator; and
limit a discriminating ability of every one of the DIP to a predetermined constant number of incorrect keys based on the output of the at least one comparator.

22. A non transitory computer-accessible medium having stored thereon computer-executable instructions for logic locking of at least one circuit, wherein, when a computer arrangement executes the instructions, the computer arrangement is configured to perform procedures: comprising:
receiving at least one distinguishing input pattern (DIP) and at least one key value thereto using at least one comparator of at least one logic-locking circuit, wherein the at least one logic-locking circuit includes at least one logic gate connected to an output of the at least one comparator; and
limiting a discriminating ability of every one of the DIP to a predetermined constant number of incorrect keys based on the output of the at least one comparator.

* * * * *